Sept. 18, 1951 S. A. CAMPAGNA ET AL 2,568,272
ADAPTER SADDLE FOR VEHICLE HOIST
Filed March 6, 1950
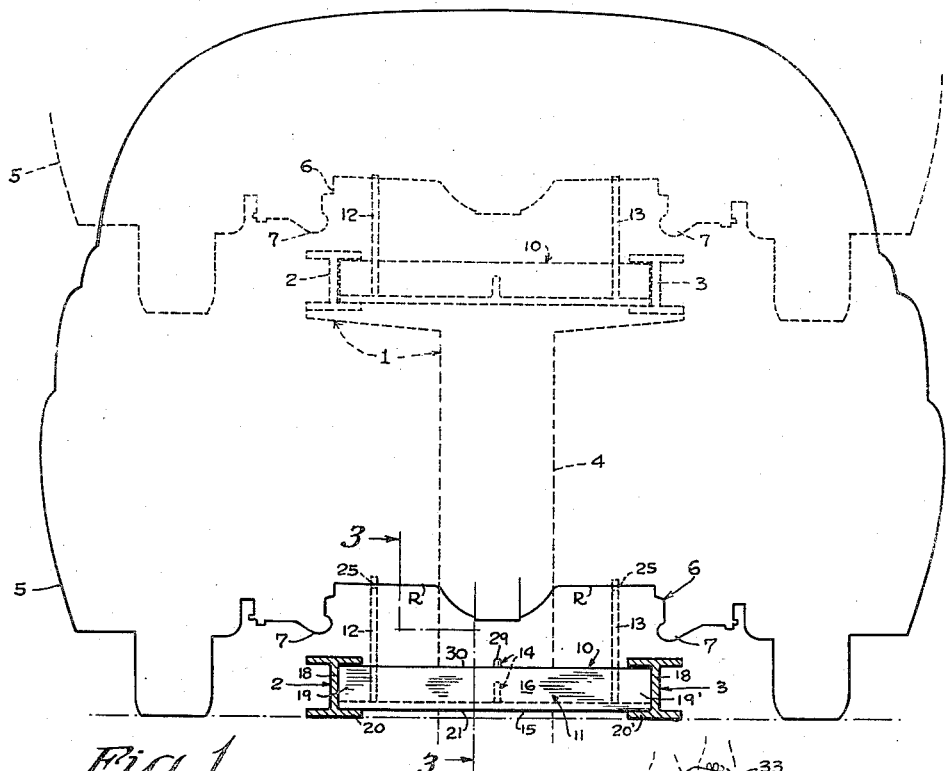
Fig. 1.
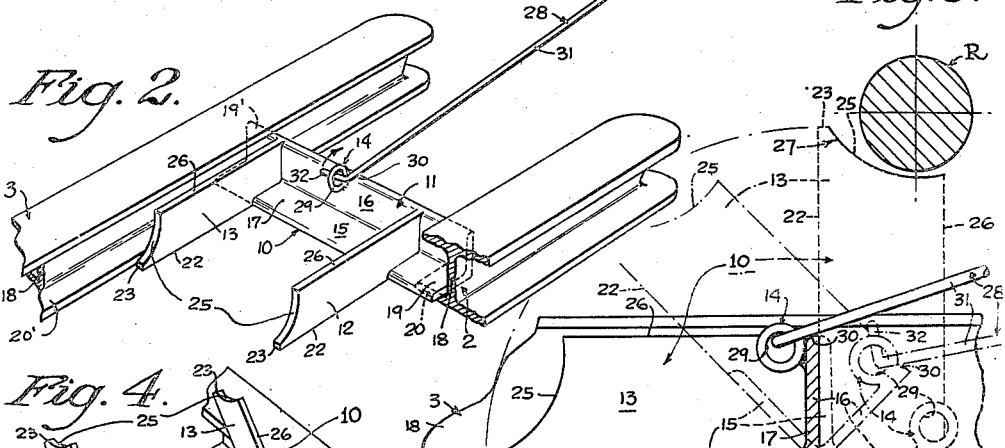
Fig. 2.
Fig. 3.
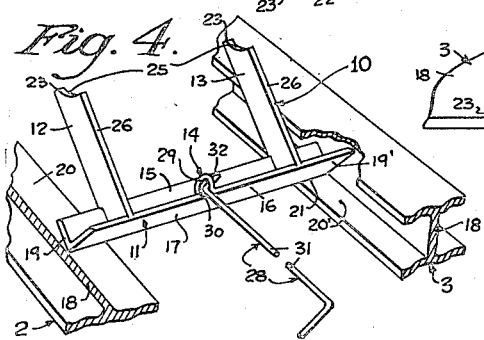
Fig. 4.
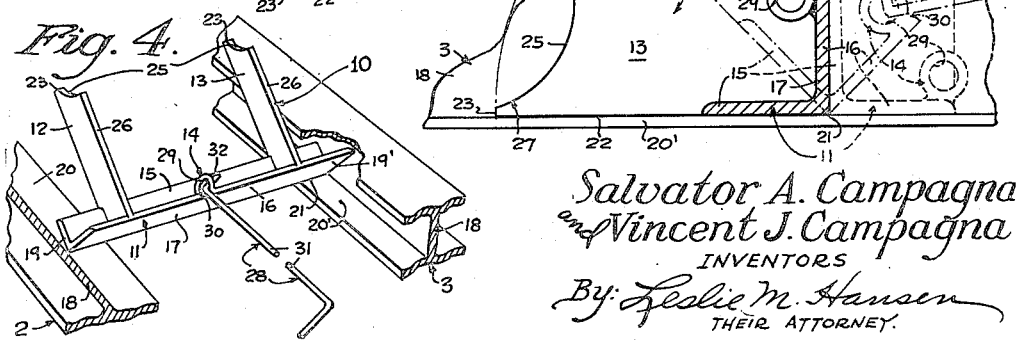
Salvator A. Campagna
Vincent J. Campagna
INVENTORS
By Leslie M. Hansen
THEIR ATTORNEY.

Patented Sept. 18, 1951

2,568,272

UNITED STATES PATENT OFFICE 2,568,272

ADAPTER SADDLE FOR VEHICLE HOIST

Salvatore A. Campagna and Vincent J. Campagna, San Jose, Calif.

Application March 6, 1950, Serial No. 147,832

4 Claims. (Cl. 254—89)

1

This invention relates to hoists for automotive vehicles and more particularly to an adapter saddle so constructed as to accommodate conventional hoists for use with substantially all types and models of automotive vehicles.

The hoist with which the adapter saddle of the present invention is most suitably employed is the parallel rail type associated with one or more vertically disposed hydraulic lifts. In such types of lifts the rails extend in a horizontal plane parallel to the fore to aft axis of a vehicle so as to be straddled by the wheels of such vehicle, that is with the rails disposed between them.

Various forms of rear axle blocks have been developed for attachment to the lift bars or rails of a hoist so as to swing freely from inoperative to operative position relative thereto despite the extremely low disposition of some of the parts of present day vehicles. One such form of axle block is shown and described in our copending application Serial No. 75,035, filed February 7, 1949.

The present invention relates to improvements over the structure shown in our aforementioned application and is particularly concerned with the provision of a saddle adapter which is simple in construction, economical from the standpoint of manufacture and highly efficient in use with conventional channel or H shaped rails of a hoist.

It is an object of the present invention to provide an adapter saddle which in its inoperative position is confineable within the horizontal and vertical limits of the rails of conventional vehicle hoists so as to eliminate obstruction of passage of the vehicle over the rails during placement of a vehicle over the hoist.

Another object is to provide a vehicle hoist accessory with a saddle arm adapted to move from inoperative to operative position through a plane parallel to the fore to aft axis of a vehicle disposed to be lifted by the hoist.

Another object is to provide a vehicle hoist accessory adapted to be adjusted from inoperative to operative position in a simple and facile manner.

Yet another object is to provide an adapter saddle for vehicle hoists which is devoid of structural or pivotal connection with the hoist rails or brackets supported thereon, the present saddle being merely slidably supported on the inwardly extended flanges of the hoist rails.

Other objects and advantages will become apparent from the following description when read in the light of the drawings in which:

2

Fig. 1 is a transverse section of a vehicle hoist with the adapter saddle of the present invention disposed between the rails thereof and illustrating its relationship between a vehicle and the hoist.

Fig. 2 is a fragmentary perspective view of the new adapter saddle as shown in Fig. 1 and illustrating the mode of raising the saddle into operative position.

Fig. 3 is a vertical section of Fig. 1 taken substantially along line 3—3 thereof and at slightly larger scale with respect thereto.

Fig. 4 is a fragmentary perspective of the hoist rails with the adapter saddle of the present invention part way between inoperative and operative position.

For purposes of illustration the device constituting the present invention has been shown in the drawings in use with one well-known type of hoist 1. This hoist consists of a pair of rails 2 and 3 commonly known as I or H shapes suitably secured in spaced relation by a cross beam, not shown, by which the rails are operatively connected to a cylindrical ram 4 shown in dotted lines in Fig. 1.

The rails 2 and 3 are disposed in parallelism in a common horizontal plane and are normally disposed to rest upon a surface constituting the floor level of a garage or service station wherein the hoist is located. These rails are usually limited in height to the maximum floor clearance possible with any one of the makes of automobiles on the market. To be specific, these rails are seldom more than five inches high because otherwise in driving a car or automobile vehicle over them there would be a danger of some part of the vehicle scraping along the rails.

An example of the limitations in floor clearance is shown in Fig. 1 by the outline of the body 5 and illustration of the under carriage 6 of a well-known make of automobile of present day design. The trend has been toward lowering the body and chassis to such extent that it is obviously no longer possible for a man to crawl beneath and to work upon the under carriage from floor level. Moreover, the under carriages of late model cars are so designed that there are obstructing appendages or instrumentalities such as the shock absorbers 7 which overlie and are so disposed relative to the adjacent rails as to prevent insertion of a saddle beneath them. In this connection, note how close the lower ends of the shock absorbers are to the top surfaces of the rails. From this it is apparent that saddles adapted to swing in a plane transverse to the long axis of the car would be obstructed from moving into an erect position by reason of the proximity of the shock absorbers 7 relative to the top face of the rails.

The adapter saddle unit of the present invention is generally designated by reference numeral 10 and comprises a base 11 having arms 12 and 13 extending therefrom so balanced as to readily tilt as a unit when an independent force is applied to an eye 14 disposed in a predetermined position relative to the base 11.

The base 11 is formed to provide flanges 15 and 16 disposed at right angles to each other and is preferably a piece of stock angle iron 17. The angle iron 17 is of a length so as to freely slide between the webs 18 of rails 2 and 3 with the extreme ends 19—19' of the base adapted to be born by the lower inner flanges 20—20' of the rails when the angle iron base is disposed perpendicular to the rails.

It should be noted that the flanges 15 and 16 of the base are dimensioned, at least adjacent their bearing ends 19—19' so that sufficient clearance is provided between the upper and lower flanges of the rails to permit the base to slide lengthwise the rails. This clearance further facilitates freedom of the angle iron 17 to tilt about an axis defined by its heel ridge 21 from a position wherein one of its flanges; e. g., 15 is supported on the lower inner flanges 20—20' of the rails to a position wherein the opposite flange 16 lies upon such flanges.

The arms 12 and 13 may be formed integrally with the base 11 but preferably each arm comprises a length of cold rolled steel secured as by welding to the inner faces of the flanges 15—16 of the angle iron 17. Each arm 12 and 13 is of sufficient thickness and width to support the load to be borne, and is of a length suitable to fit beneath the rear axle housing R of a vehicle when the arms extend vertically from the base 11. The arms are spaced from each other a distance slightly less than the distance between the extremities of the inner flanges of the rails 2 and 3 to permit free swinging movement relative to the rails and to place the concentrated load borne by the arms as close as possible to the bearing ends 19—19' of the base.

The arms 12 and 13 each have their securing ends cut to conform to the contour of the inner faces of the flanges 15 and 16 with the edge 22 of each arm extending in the same plane as the outer face of flange 15. For purposes of orientation these edges 22 will be termed the leading edge of the arms because they preferably face forwardly of the vehicle to be supported by the arms. The free end 23 of each arm 12 and 13 is of concave form to provide a cradle or seat 25 adapted to receive the rear axle housing R in the manner as illustrated in Fig. 3. It should here be noted that the axis of the arc of the concave seat on each arm is slightly offset rearwardly relative to the long axis of the respective arm. In this manner the leading edge 22 of each arm is slightly higher than the trailing edge 26 thereof so that when the entire saddle 10 is slid rearwardly on the supporting flanges 20—20' of the rails the higher portion 27 of the arms engage the housing R to indicate that the arms 12—13 are properly disposed to receive the rear axle housing.

When the adapter saddle 10 is disposed in inoperative position the base 11 lies with the bearing ends of its flange 15 resting upon the lower inner flanges 20—20' of the rails, full lines Fig. 3 and Fig. 2. In this position the arms 12—13 lie substantially parallel to the rails 12—13 so that no part of the saddle extends above the rails where they may be struck by appendages of the vehicle when it is driven onto the hoist.

Means for tilting the saddle from the foregoing position into operative position comprises the eye 14 and a crook 28, see Figs. 2 through 4. The eye 14 could be of any form suitable for the purpose but in the present disclosure it consists of a wrought iron ring 29 of predetermined diameter and secured by welding or the like tangentially of and to the inner face of the flange 16 of the base 11. More specifically this ring 29 is disposed with a portion of its internal annulus exposed slightly beyond the extreme edge 30 of the flange 16 for reasons now to be made apparent.

The crook 28 comprises an independent rod 31 having opposite end portions 32 and 33 thereof bent preferably in diametrically opposite directions with respect to the long axis of the rod 31. In this manner the end portion 33 comprises a handle or lever for turning the rod about its axis in crank-like fashion. The opposite end of the rod 31 is adapted to lie upon the extreme edge 30 of the flange 16 when it is in vertical position and end portion 32 of the rod is adapted to extend through the eye formed by the ring 29.

As previously explained a portion of the internal annulus of the ring 29 extends slightly above the edge 30 of flange 16. The arrangement is such that the portion of the rod 31 resting on the edge 30 of flange 16 forms a fulcrum for the rod when it is turned clockwise by manipulation of the handle 33 as shown in Fig. 2. The turning force of the rod thus exerted effects clockwise turning of the end portion 32 of the rod upwardly against the projected inner annulus of the ring 29 whence a downward thrust is exerted upon the convex edge of the angle iron flange 16. This downward thrust is in effect a transmission of the downward thrust upon the handle portion 33 of the crook 28, the ring, in effect, becoming a fulcrum base, and as a result thereof the entire saddle unit 10 begins to tilt, clockwise Fig. 3, about the heel ridge 21 of base 11 where it bears against the lower flanges of the hoist rails.

The entire unit 10 is so balanced that as soon as initial tilting thereof is accomplished in the foregoing manner it is a simple matter to merely pull back upon the crook 28, see Fig. 4 and the dot-dash delineation of unit 10 in Fig. 3. Once the structure is over balanced, i. e., with its center of gravity swung past the fulcrum provided by the heel ridge 21 of the base, the unit gravitates into operative position with the bearing ends of the flange 16 resting on the inner flanges 20—20' of the hoist rails and the arms 12 and 13 standing vertically. Should the unit be too far forwardly of the rear axle housing R of the vehicle the unit can be shifted back by means of the crook 28 until the higher portion 27 of the arms touch the housing.

With the unit 10 in operative position as shown in dotted lines Figs. 1 and 3 the hoist 1 may be raised and the vehicle with it in a manner well known in the art. The bearing ends 19—19' of base 11 of the flange 16 resting flatly upon the inner flanges 20—20' respectively of the hoist rails assures maintenance of the unit 10 in a stable condition while supporting the vehicle. After the hoist has been lowered to floor level the unit 10 is merely tipped forwardly by the crook 28 or any outside force so that the arms 12 and 13 fall into horizontal position between the rails 2 and 3. The arms 12—13 are held in substantially parallel relation to the rails by reason of the binding effect of the bearing ends 19—19' of the base member 11. In other words, although the weight and disposition of arms 12 and 13 tends to cause further downward movement of the arms the angle iron base 11 will be limited against further turning by the lower and upper flanges of the rails.

While we have shown one specific form of construction in the foregoing disclosure, it will be apparent to those skilled in the art that variations in form and modifications of construction may be made without departing from the spirit of the invention. We therefore desire to avail ourselves of all modifications, variations and alterations in structure coming within the scope of the appended claims.

What we claim as new and desire to protect by Letters Patent is:

1. The combination with a vehicle hoist having spaced parallel lifting rails, of a base adapted to bridge said spaced rails and provided with two sets of rail bearing surfaces disposed at substantially right angles to each other, a pair of arms extending from said base parallel to one set of said rail bearing surfaces adapted to lie parallel to said rails when a vehicle is moved relative to the latter and extending perpendicular to the other set of said rail bearing surfaces so that the upper ends of said arms engage the under structure of said vehicle to support the same on said rails when the arms are in a vertical position, said base having an eye formed thereon adjacent the upper edge thereof with the axis of said eye extending parallel to said base and a manually operable rod having a crooked end adapted to extend through said eye and having an adjacent portion to bear against the upper edge of said base when said arms are horizontally disposed whereby upon turning of said rod about its long axis said crooked end of said rod bears against an extremity of said eye to force the adjacent portion of said rod against the upper edge of said base to tilt the base from a position in which its arms are horizontal toward a position in which they are vertically disposed.

2. A device adapting a vehicle hoist for lifting vehicles including a pair of spaced parallel struts, a base for said struts, said base comprising a length of angle iron having a heel ridge formed between right angle flanges one of which flange forms a foot for the end of said spaced struts, the other flange being secured to an edge of said struts whereby to support said struts in either a horizontal inoperative or a vertical operative disposition and for tilting movement about the heel ridge of said angle iron from one to the other of said dispositions, and means for effecting tilting of said struts and angle iron from inoperative toward operative disposition comprising a ring secured to the inner face of the foot forming flange of said angle iron and so disposed relative to the free edge of said flange as to receive an actuating bar disposed substantially parallel to said length of angle iron, and a rod having a crooked end forming an actuating bar insertable through said ring with an adjacent portion of said rod resting upon the free edge of said foot forming flange to exert a diagonally directed thrust from said ring toward said free edge of the foot forming flange when said rod is turned about its axis to urge its actuating bar toward the inner perimeter of said ring.

3. The combination with a hoist of the type including spaced parallel rails of an angle iron base having perpendicularly disposed flanges joined to form a heel ridge between them, the outer ends of which flanges provide perpendicular bearing faces adapted to rest upon said spaced rails for facilitating rocking movement of said angle iron base about said heel ridge so that one or the other of pairs of said bearing faces lie flat upon said rails, a pair of vehicle supporting arms extending from the inner surfaces of one flange of said angle iron base in parallelism with respect to the pair of said bearing faces on said one flange and perpendicular to the bearing faces on the other one of said flanges, a ring secured to said other one of said flanges in a position in which the axis of the opening of said ring is parallel to said heel ridge and a portion of the opening in said ring is above the adjacent upper edge of the flange to which said ring is secured when the arms are in horizontal position, and a rod having a crooked end adapted to extend through the opening in said ring and having a portion adjacent the crooked end of the rod disposed to engage the adjacent upper edge of the other one of said flanges in such a manner to exert a thrust against said upper edge when the rod is turned on its axis to cause the crooked end of the rod to bear against the ring whereby to tilt the angle iron base toward a position in which the arms will be vertically disposed.

4. The combination with a vehicle hoist of the type employing spaced rails with the flanges of one rail facing those of the other rail, of a unitary saddle comprising a length of angle iron having right angle flanges providing bearing surfaces adapted to be supported between the flanges of opposite rails for tilting movement wherein one of the other corresponding sets of said bearing surfaces rest upon the rail flanges supporting them, a vehicle supporting strut extending from the inner faces of the flanges of said length of angle iron so as to extend parallel to said rails when one set of said bearing surfaces rest upon the rail flanges or to extend perpendicular to said rails when the other set of said bearing surfaces rest upon the rail flanges, to transfer the load of a vehicle on said strut to said rails, a ring secured to the inner face of the angle iron flange providing the load transferring bearing set of said bearing surfaces and extending slightly beyond the free edge of said angle iron flange with the opening of said ring parallel to said length of angle iron, and a manually controlled rod having a crooked end adapted to extend through the opening of said ring with a portion of said rod adjacent said crooked end thereof bearing upon the adjacent free edge of said angle iron flange when the vehicle supporting strut is parallel to said rails whereby to tilt said angle iron relative thereto when said rod is turned about its long axis in a direction to cause the crooked end of said rod to exert a thrust against the extended upper portion of said ring and effect a resultant thrust of said rod against the adjacent free edge of said angle iron flange.

SALVATORE A. CAMPAGNA.
VINCENT J. CAMPAGNA.

No references cited.